United States Patent [19]

Swanson et al.

[11] Patent Number: 4,469,993
[45] Date of Patent: Sep. 4, 1984

[54] PROGRAMMABLE MULTIPLE POSITION MACHINE

[75] Inventors: Douglas L. Swanson, McKean; Ronald K. Turk, Erie, both of Pa.

[73] Assignee: Swanson Systems, Inc., Erie, Pa.

[21] Appl. No.: 347,715

[22] Filed: Feb. 10, 1982

Related U.S. Application Data

[63] Continuation-in-part of Ser. No. 240,146, Mar. 3, 1981, Pat. No. 4,405,505.

[51] Int. Cl.³ ........................................... G05B 13/00
[52] U.S. Cl. .................................... 318/561; 318/603; 198/859
[58] Field of Search ............... 318/661, 561, 592, 603; 198/341, 345, 859

[56] References Cited

U.S. PATENT DOCUMENTS

| | | | |
|---|---|---|---|
| 3,699,555 | 10/1972 | Du Vall | 340/174.1 |
| 3,700,379 | 10/1972 | Robertson | 444/1 |
| 3,729,668 | 4/1973 | Brette | 318/561 |
| 3,731,177 | 5/1973 | Commander | 318/603 |
| 3,739,158 | 6/1973 | Woodward | 235/151.11 |
| 3,748,563 | 7/1973 | Pomella | 318/573 |
| 3,749,996 | 7/1973 | Pomella | 318/571 |
| 3,809,986 | 5/1974 | Visser | 318/561 |
| 3,818,300 | 6/1974 | Stroman | 318/561 |
| 3,835,360 | 9/1974 | Kiwiet | 318/561 |
| 3,893,616 | 7/1975 | Trousdale | 235/151 |
| 3,914,677 | 10/1975 | MacWade | 318/561 |
| 3,917,930 | 11/1975 | Davey et al. | 318/561 |
| 4,031,442 | 6/1977 | Poppelreiter | 318/561 |
| 4,031,443 | 6/1977 | Droux | 318/561 |
| 4,066,941 | 1/1978 | Foster | 318/341 |
| 4,099,112 | 7/1978 | Klinger | 318/561 |
| 4,103,314 | 7/1978 | Case | 360/78 |
| 4,143,310 | 3/1979 | Fujinawa | 318/571 |
| 4,219,766 | 8/1980 | Lin | 318/592 X |
| 4,221,998 | 9/1980 | Haught et al. | 318/592 X |
| 4,311,945 | 1/1982 | Aoyama | 318/561 |
| 4,338,659 | 7/1982 | Kurakake | 318/561 X |
| 4,355,273 | 10/1982 | DuVall | 318/561 |

*Primary Examiner*—B. Dobeck
*Attorney, Agent, or Firm*—Willian, Brinks, Olds, Hofer, Gilson & Lione Ltd.

[57] ABSTRACT

A method and apparatus for electronically controlled movement and positioning. The method includes encoding absolute position signals, reading out digital velocity signals from a memory responsive to the absolute position signals in accordance with a velocity-position profile, converting the digital velocity signals to analog signals and scaling the analog signals so that they may be used to drive a motor. The apparatus is a programmable electronic controller which performs the method.

10 Claims, 9 Drawing Figures

PROGRAMMABLE MULTIPLE POSITION MACHINE

BACKGROUND OF THE INVENTION

This is a continuation-in-part of pending U.S. patent application Ser. No. 240,146, filed Mar. 3, 1981, now U.S. Pat. No. 4,405,505, assigned to the assignee of the present invention.

The present invention relates to a method and apparatus for electronically programmed control of machine movement, and in particular to a programmable movement, multiple position machine. Carefully controlled movement is accomplished in a pre-defined, but easily adjustable fashion. The apparatus of the present invention can be used as an assembly machine or a material moving or handling machine for the transferring of work between stations, machine operations, or automatic work handling devices. The electronically programmable control can be used with mechanical apparatus, hydraulic apparatus or some other type of movement machines.

Prior art work transfer and positioning devices in the assembly machine field have included multiple position indexers and indexing machine chassis. Indexers and indexing machine chassis have widespread commercial application to relatively high speed multiple position production machines. Such machines are typically "dedicated" to one task or set of tasks, and are used for such operations as multiple position machining, testing, heating, cooling, and assembly. One of the more common lines of indexers and indexing machine chassis utilize a cam to translate continuous motor input to intermittent output motion which in turn moves and stops a series of work handling fixtures or work positions themselves. The number of output positions of such a drive are typically not variable, but are fixed by the relationship of the cam to its driven components.

One particular type of multiple position production machine is a rotary assembly machine, such as disclosed in U.S. Pat. Nos. 2,921,478, 3,065,530 and 3,231,968, assigned to the assignee of the present invention, and includes an indexer for a rotary table which is moved or indexed in a number of selected increments. As the table is indexed in the various increments, assembly or test processes are performed on parts resting on the table. The assembly machine can also be of the in-line variety, having a continuous or articulated belt or articulated links on which the part to be worked on is also intermittently indexed through a number of work stations.

An indexer associated with such a rotary assembly machine is the apparatus that moves the rotary table incrementally. Such an indexer is typically actuated mechanically by a motor driven cam. The cam is so shaped that it engages and imparts motion to a series of followers in order to rotate the table during a particular portion of the rotation of the cam, and then disengages from the followers, or the cam is shaped so that it no longer imparts displacement motion to such followers, so that the table dwells or remains at a fixed position during another period of rotation of the cam. The dwell period may be a major portion of the cam rotation cycle period.

In order to accomplish the required precise movements, the cam that controls the indexer must be cut carefully and to an exactly prescribed design. In these mechanically controlled indexers of the prior art, such as disclosed in U.S. Pat. Nos. 2,887,209, 2,921,478, 2,990,940 and 3,039,597, assigned to the assignee of the present invention, a new cam must be used for each type of indexing motion desired. Typical indexers of the prior art do not require variable acceleration, direction of motion, and length of travel indexing, so a mechanical cam control of indexing is satisfactory. The utility of such indexers is, however, limited because of the difficulty of mechanically changing the cam design so as to provide adjustable incremental motion for various operations. Therefore, cam driven indexers associated with such prior art machines have limited utility for variable work transfer applications.

Known electronic positioning machines typically utilize feedback signals indicating both velocity and position. The time needed for processing both of these signals limits the ability of these machines to respond quickly to machine movement. Position and velocity are generally determined in the prior art machines by a pulse feedback system, requiring complex and costly accumulation and comparison circuitry for processing the feedback signals. Another disadvantage of the pulse feedback systems is that they are prone to positioning inaccuracies. In the adverse environments of high speeds and high industrial electrical noise, the "loss" of a pulse may easily occur causing errors in positioning. In stringent applications, even the slightest error may be critical.

Within recent years, automatic parts handling machines have been developed that are commonly called "robots." Such robots can perform a number of movements with respect to a work piece; they may also move the work piece to its work place and remove it from the work place. The mechanical hands of such robots may grasp, rotate, and operate a work piece. The proliferation of such robot technics has required the use of more versatile and sophisticated work transfer machines to bring the work to and take the work from the robot location, and have heightened the need for a method and apparatus such as the present invention, i.e., one that accomplishes multiple position movement in a pre-defined, carefully controlled but easily adjustable fashion.

SUMMARY OF THE PRESENT INVENTION

According to the present invention, there is provided a method and apparatus for electronically programmed control of machine movement that overcomes the limitations and disadvantages of the prior art. The apparatus of the present invention includes means for encoding absolute position signals, means for addressing a memory with the absolute position signals to obtain digital velocity signals in accordance with a velocity-position profile and output means for changing the digital velocity signals into analog velocity command signals to drive a movement machine. The command signals are determined solely as a function of absolute position of the movement machine. One embodiment of the machine combines the electronic velocity control with a rotary table for advancing items on which work is to be performed.

According to the present invention, the signals sent to the motor are solely a function of the position of the machine. Thus, the machine's velocity is not measured, thereby allowing quick and accurate response during the machine's entire movement. A cost savings also results, since there is no need for circuitry to determine and compare velocities. Furthermore, the use of position as the sole determinant of the velocity control is advantageously immune from variations in motor loading.

Use of absolute position signals has many advantages over the pulse feedback systems of the prior art. Absolute position negates the need for complex and costly accumulation and comparison circuitry. The use of absolute position signals is quicker than other systems, advantageously allowing controlled movement in conformity with a velocity-position profile even at high speeds. Whereas pulse feedback systems are subject to positioning inaccuracies especially at high frequency transmission rates, the absolute feedback system results in extremely accurate positioning. The absolute feedback system is immune from the effects of high industrial electrical noise.

According to the present invention, a velocity-position profile is used which provides control over the velocity, acceleration and positioning of a movement machine. Acceleration is controlled as a necessary physical result of controlling velocity, since acceleration is equal to the rate of change of the velocity. Control over the velocity of a machine throughout a move insures that objects carried by the machine are not subject to any excessive acceleration forces. The variability of the velocity-position profile through programming, advantageously enables the production of profiles particularly suited to the objects being moved. Thus, objects with varying abilities to withstand acceleration forces may be moved in the optimum manner through the use of the present invention.

The present invention also easily varies the amount the objects are to be moved, by selecting the number of movement units to be moved. One movement unit is the smallest incremental move the machine can make. The machine is accelerated to a maximum velocity in the first half of a movement unit and decelerated to a standstill in the second half of a movement unit. Between these segments the machine is controlled at a constant velocity until it is in position for the deceleration phase.

The apparatus of the present invention has a wide variety of applications, and is not intended to be limited to a specific work transfer, machining, testing, assembling or other sequential manufacturing environment. It could be used to interface with other machines to provide a more sophisticated work transfer means than that used in the prior art. It can also be used to accomplish sophisticated work transfer in order to function as a multiple parts conveyor in a rotary, linear or other configuration. A linear configuration is provided by connecting a conveyor for separate pallets in a recirculating fashion around a support, with a work transfer means mounted at one or more ends to provide incremental motion of the pallet conveyor having multiple work holders to one or more positions.

The programmable electronic velocity control may be provided by a microprocessor, a minicomputer, assorted gate logic hardware, a programmable controller such as a Modicon brand type 464, or other such additional hardware. The control is accomplished in accordance with a defined set of distances, timing, acceleration, deceleration, and velocity of a multiple number of pallets or other work or fixture holding devices. The apparatus of the present invention may be used to receive parts, to perform operations on parts, to carry or transfer parts, and so on. It can thus be seen that the apparatus of the present invention is significantly more flexible in use than prior art apparatus. It provides a variety of desirable work transfer modes, distances of movement, velocity rates, and acceleration and deceleration patterns, depending on the programmable information provided in the electronic control package.

These and other objects, advantages and features of the present invention will become apparent upon a reading of the detailed description of the preferred embodiments below in conjunction with the accompanying drawings.

DETAILED DESCRIPTION OF THE PREFERRED EMBODIMENT

Figure 1:
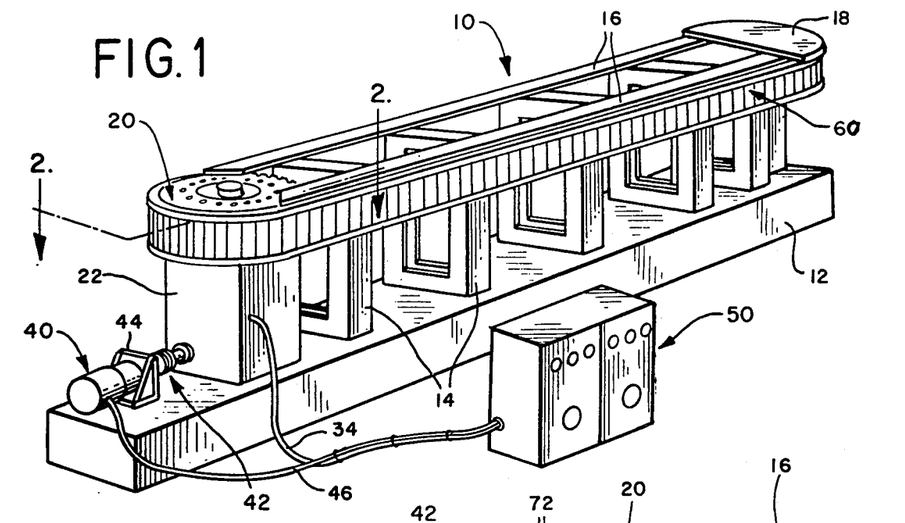
FIG. 1 is a perspective view of a linear embodiment of a multiple position programmable movement machine of the present invention, including a horizontal pallet conveyor.
Figure 2:
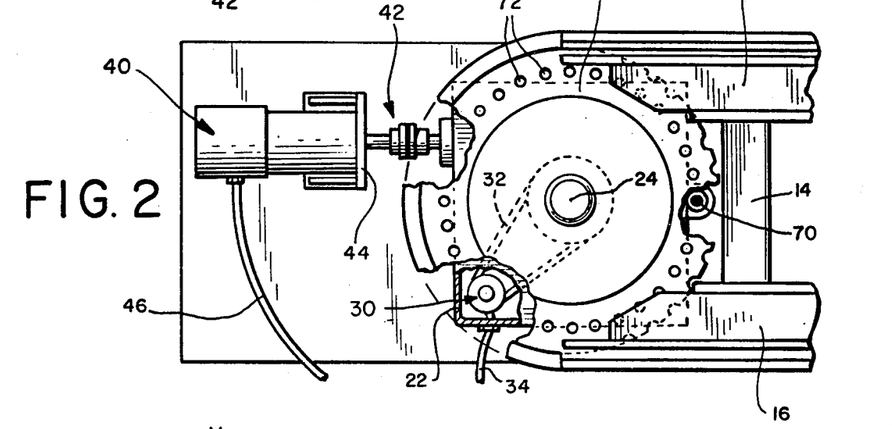
FIG. 2 is a plan view of the linear multiple position programmable movement machine of FIG. 1 taken along line 2—2.

Referring now to FIGS. 1 and 2, there is shown a preferred linear embodiment of the multiple position programmable movement machine of the present invention, indicated generally in FIG. 1 by reference numeral 10.

The linear multiple position programmable movement machine 10 includes a rotary transfer table 20, a position resolver 30 connected to a drive shaft 24 for the rotary transfer table 20, a drive motor 40 for the rotary transfer table 20, a programmable controller 50, a pallet means 60, and a positioning device 70. Each of these elements cooperates to produce a machine which intermittently moves a transfer table so that the pallets 60 are advanced at intervals in a generally linear fashion around the periphery of the machine 10.

The pallets 60 are supported around the periphery of the machine 10 on a conveyor or link connector, with the rotary transfer table 20 at the driving end and an end support 18 at the dummy end, which permits the pallet links to recirculate the machine 10 under the driving influence of the moving rotary transfer table 20. Upper support plates 16 provide additional support for the linked arrangement of the pallets 60. The upper support plates 16 rest on samsons 14 mounted on a support block 112.

The rotary transfer table 20 is supported by a housing 22 and is rotated by a drive shaft 24. While not shown with particularity in FIGS. 1 or 2, the drive shaft 24 is suitably connected to the drive motor 40 and its motor drive train 42 by means of a worm gear arrangement, such as indicated by reference numeral 148 in FIG. 4. Alternatively, the gear arrangement may be a pair of bevel gears, a pair of helical gears meshed with axes at a 90° angle, or any such suitable speed reducing arrangement. The drive train 42 is a suitable train as is known in the art.

The rotary transfer table 20 is maintained in selected positions of rotary movement by a positioning device 70 which engages positioning holes 72 in the rotary transfer table 20. In order to measure the actual position of the rotary transfer table 20, a resolver 30 is coupled to the drive shaft 24 of the rotary transfer table 20 by means of an encoder pulley 32. The resolver 30 is part of an encoder. The other parts of the encoder are an encoder signal line 34 and a converter which is within the programmable controller 50. The resolver 30 is calibrated with the positions of the positioning hole 72 or other markings on the rotary transfer table 20 so as to produce a signal corresponding to the rotary position of the rotary transfer table 20. As best seen in FIG. 2, the outer periphery of the rotary transfer table 20 has notches provided to engage inner surfaces of the linked pallets 60 to advance the pallets 60 as the rotary transfer table 20 is turned about its axis.

Figure 3:
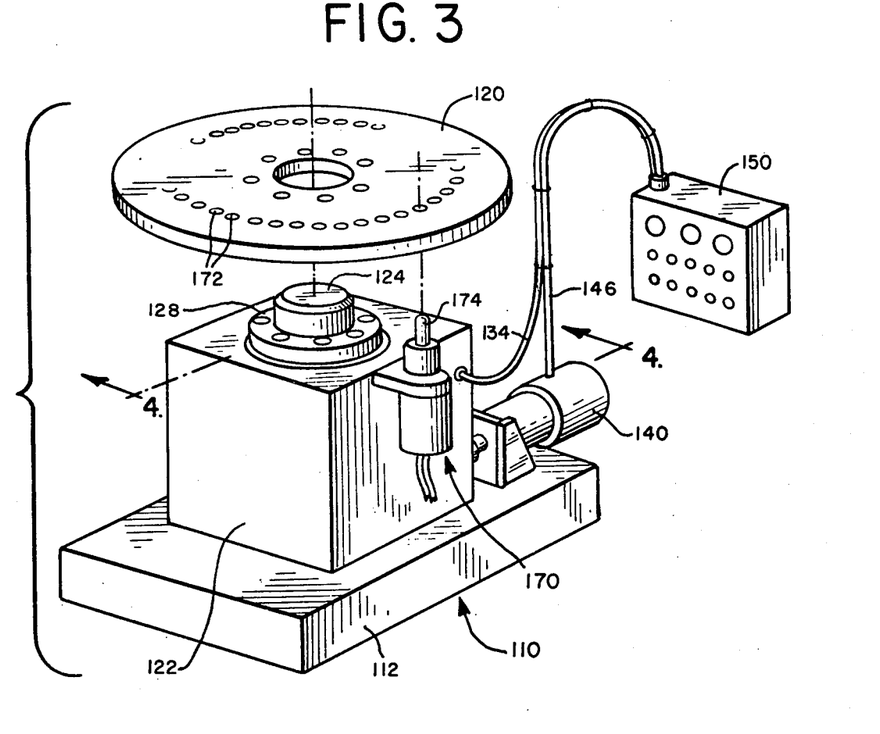
FIG. 3 is a partially exploded view of a rotary embodiment of a multiple position programmable movement machine of the present invention.
Figure 4:
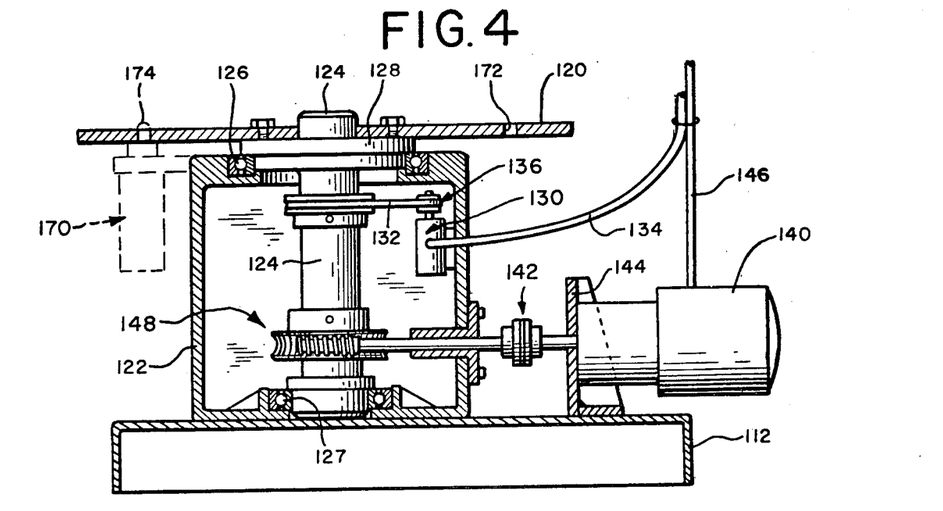
FIG. 4 is a partially sectioned view of the rotary multiple position programmable movement machine of FIG. 3, illustrating the work transfer table, drive motor, and associated support and linkage, and taken through line 4—4 of FIG. 3.

FIGS. 3 and 4 show an alternative embodiment of the present invention, a rotary multiple position programmable movement machine indicated generally by reference numeral 110. This machine is similar to a portion of the linear embodiment of the machine shown in FIGS. 1 and 2. The rotary machine 110 includes a rotary transfer table 120, a position resolver 130, a drive motor 140, a programmable controller 150, and a positioning device 170. The rotary transfer table 120 is mounted onto a mounting plate 128 and around the drive shaft 124. The mounting plate 128 and the drive shaft 124 are welded or joined by some suitable means to provide a unitary drive connection with the rotary transfer table 120. The drive shaft 124 is supported for rotation in the support housing 122 by means of an upper support bearing 126 and a lower support bearing 127.

As can be seen in FIG. 3 and phantom lines in FIG. 4, a positioning means 170 is provided with a type of locating, positioning and holding device to secure the rotary transfer table 120 in a desired position. A pin 174 fits within any one of the positioning holes 172 to secure the rotary transfer table 120. The positioning means 170 is of course engaged only when the drive motor 140 is not operating to move the rotary transfer table 120. The position resolver 130, connected to the drive shaft 124 through a drive belt 132 wrapped around the encoder shaft and pulley arrangement 136, provides an absolute measure of actual position of the rotary transfer table 120. The analog signal produced by the resolver 130 travels along encoder signal line 134 to the programmable controller 150 to provide the positioning information used as set forth below. Unlike the pulse feedback systems of the prior art, this analog signal line 134 is immune to electrical noise. Also, the motor drive signal line 146 comes from the programmable controller 150 and energizes the drive motor 140 in a fashion as described below.

The motor support 144 provides necessary support for the drive motor 140 adjacent the drive train 142 so that the worm gear arrangement 148 operates to rotate the drive shaft 124. The drive train 142 is of the standard variety as is known in the art, and the worm gear arrangement 148 may be replaced by any suitable speed reducing arrangement, such as worm or bevel gear arrangements, as discussed above. All the components of the rotary machine 110 rest on a support base 112.

Figure 5:
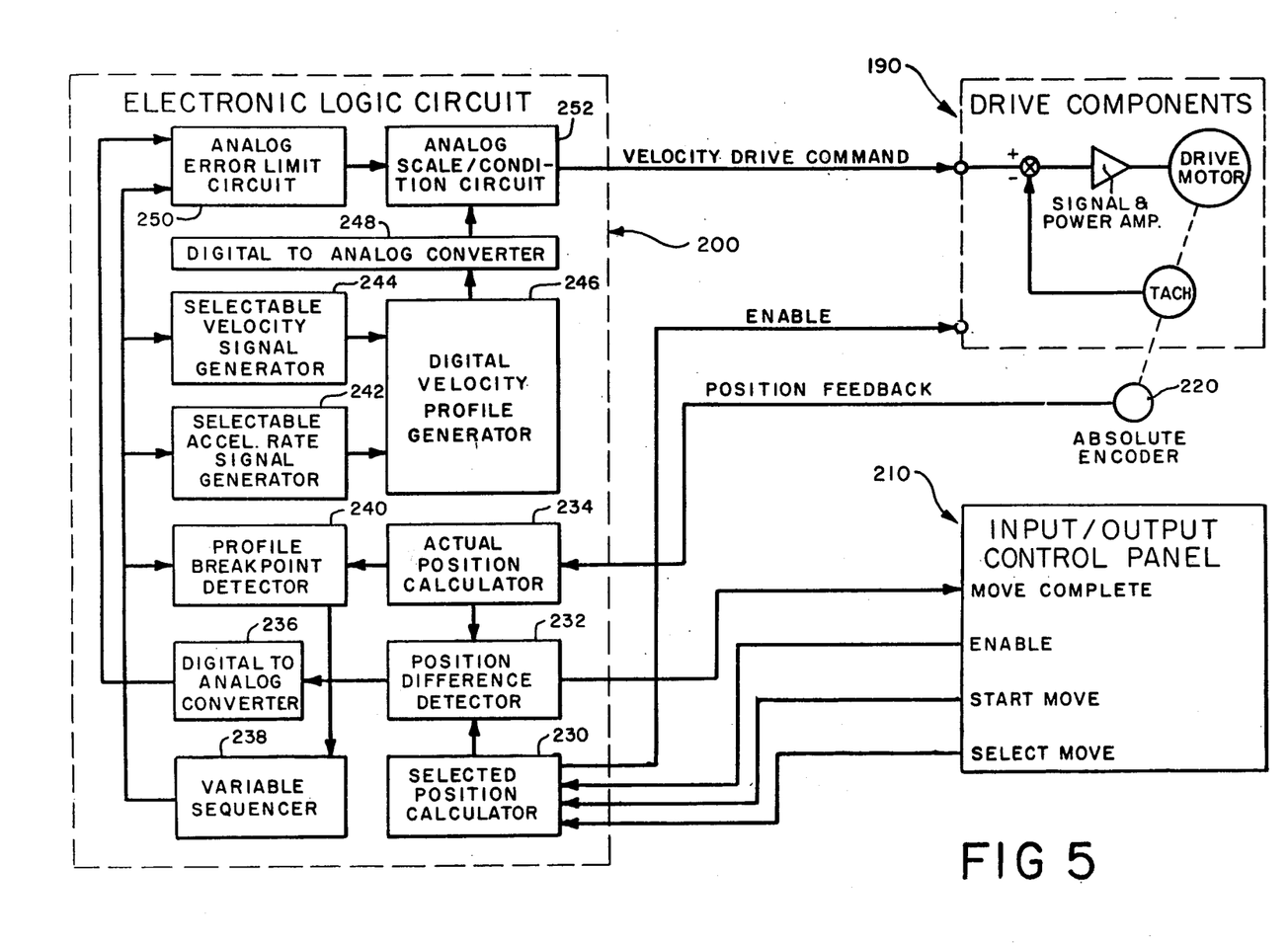
FIG. 5 is a detailed block diagram of the programmable electronic control of the present invention applicable to both the linear and rotary embodiments, and including an input and output control panel, and electronic logic circuit, and a drive component schematic.
Figure 6:
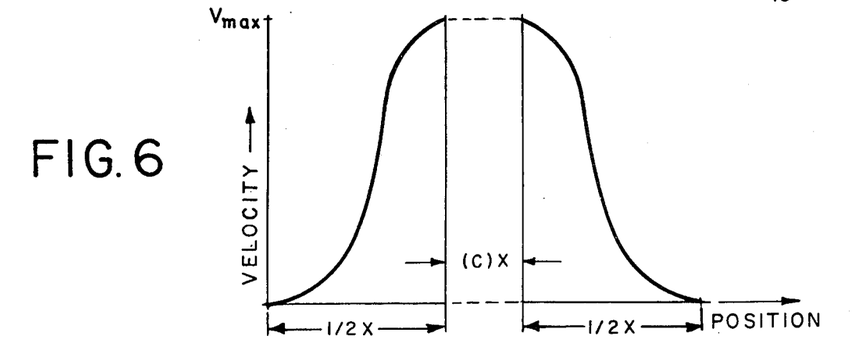
FIG. 6 is a curve showing the relationship of velocity to position during a typical cycle of rotation of the work transfer table according to the present invention.

Referring now to FIG. 5, there is shown a schematic or block diagram view of the drive components 190, the electronic logic circuit 200, and the input and output control panel 210 that make up the programmable controller 150 and drive motor 140 combination for the embodiments of FIGS. 1 through 4. FIG. 6 shows a graph of velocity versus position that illustrates one of the basic working concepts of the programmable control of the present invention. It is advantageous for the velocity versus position curve of the rotary transfer table 20 or 120 to approximate a bell curve for both the acceleration and deceleration phases of movement of the rotary transfer table 20 or 120. However, in other embodiments of the present invention, the control can be programmed to produce motion of the rotary transfer table 20 or 120 in a fashion different from the velocity versus position curve of FIG. 6.

In FIG. 6 the segment to the left identified by $\frac{1}{2}X$ is the acceleration portion and the portion to the right identified by $\frac{1}{2}X$ is the deceleration segment. The position X is the smallest incremental distance that the rotary transfer table 20 or 120 is desired to be advanced. For instance, in FIGS. 2 or 3, that distance is the distance between adjacent positioning holes 72. Longer moves can be made by causing the rotary transfer table 20 or 120 to rotate at a constant velocity $V_{max}$ for a distance identified by (C)X on the graph, where C is an integer greater than or equal to zero, and X is the smallest distance desired to advance the rotary transfer table 20 or 120. The value C will be one less than the number of increments of the smallest desired rotary transfer table advancing distance. For instance, if one desires to advance the rotary transfer table 20 or 120 three positions, the dwell distance (C)X will be 2X.

The programmable controller 50 or 150 that accomplishes this controlled motion of the transfer table is shown in FIG. 5. Block 210 is the input and output control panel having a display indicator showing that the requested move of the rotary transfer table 20 or 120 is complete, and also including an enabling switch, a switch to start the move of the rotary transfer table 20 or 120, and a switch to select that particular one of the moves desired for the rotary transfer table 20 or 120.

The three inputs of enable, start move, and select move are fed into the selected position calculator 230 of the electronic logic circuit 200. In short, the programmable electronic logic circuit 200 includes a segmented velocity-position profile stored in a profile breakpoint detector 240 that produces velocity profile outputs through a digital velocity profile generator 246 in response to actual position signals from an actual position calculator 234. Furthermore, an analog error limit circuit 250 provides a modification signal at about the final velocity-position segment to correct any differences between actual and selected positions of the work transfer table 20 or 120. The drive components 190 include a drive motor connected to a signal and power amplifier, and feedback monitor or servo-control with a tachometer that adjusts the speed of the drive motor after measuring it to be sure that it is at the right level. An absolute encoder 220 provides position feedback information to the actual position calculator 234.

The velocity-position profile is stored in the profile breakpoint detector 240 in the form of position setpoints relating to segments on a desired velocity-position curve. In one embodiment, the velocity-position curve approximates the bell curve of FIG. 6 and is divided in its acceleration portion into eight segments and in its deceleration portion into eight segments. Other suitable velocity-position curves may be designed for other types of movement. A variable sequencer 238 can operate to sequence up the eight segments, dwelled for any desired increment of distance (C)X, and then sequence downward through the eight segments. It is believed that for purposes of obtaining precise control over the rotary transfer table 20 or 120, eight segments approximating each one-half of the velocity curve are sufficient.

According to the present invention, the analog error limit circuit 250 effectively only operates when triggered by the variable sequencer 238 within the last of eight segments of the deceleration portion of the velocity profile. By knowing the relationship between velocity and position shown in FIG. 6, a table of velocity values for the rotary transfer table 20 or 120 as a function of position can be computed. The analog error limit circuit 250 limits the magnitude of the position difference signal from the position difference dector 232 that corrects differences between the actual and selected positions of the transfer means during the last segment of the velocity profile. A fine-tuning adjustment or modification signal is then fed from the error limit circuit 250 to the drive motor 40 or 140.

In detail, the operation of the electronic logic circuit is as follows. The signals from the input and output control panel 210 are fed into the selected position calculator 230. A digital selected position signal is produced by the selected position calculator 230 and fed into a position difference detector 232. The other input to the position difference detector 232 comes from the actual position calculator 234 into which an absolute encoder 220 feeds the actual position of the rotary transfer table 20 or 120.

The digital actual position signal and the digital selected position signal are both input to a position difference detector 232 which computes the difference between the position signals and produces a resultant position difference signal which is fed to a digital-to-analog converter 236. The output of the converter 236 then becomes an input to the analog error limit circuit 250. The digital actual position signal from the actual position calculator 234 is also fed into a profile breakpoint detector 240. The detector 240 contains position setpoints based upon a segmented velocity profile for the incremental motion sequence for rotating a transfer table 20 or 120, and produces a series of trigger signals, corresponding to endpoints of the velocity segments.

Each trigger signal is fed while the actual position signal indicates the position within that particular velocity segment to a variable sequencer 238. The variable sequencer 238, after noting the particular velocity-position segment in which the rotary transfer table 20 or 120 is located, selects the corresponding acceleration rate in the selectable acceleration rate signal generator 242 and the corresponding velocity in the selectable velocity signal generator 244. In other words, the selectable acceleration rate signal generator 242 is responsive to each trigger signal to produce a corresponding acceleration rate signal and the selectable velocity signal generator 244 is responsive to the trigger signal to produce a corresponding velocity signal.

These velocity and acceleration rate signals are fed into a digital velocity profile generator 246 that produces a velocity profile output that changes at a rate provided by the selectable acceleration rate signal. This velocity profile output is fed through a digital to analog converter 248 and input to a scaling means 252 indicated as the analog scale/condition circuit. The analog error limit circuit 250 is responsive to the analog position difference signal and to the variable sequencer 238 so that it operates during the last velocity segment to check the difference between the actual position of the work transfer table 20 or 120 and the requested position of the work transfer table 20 or 120 and to limit the magnitude of the change to the planned velocity profile output. The analog error limit circuit 250 produces a modification signal input to the scaling means 252. The scaling means 252 sums the analog velocity profile output and the modification signal, converts them to the appropriate scale for the drive component 190, and produces a drive velocity command to the drive components that operates, while the enable input to the drive components is present, to rotate the drive motor at the appropriate level to accomplish rotation of the rotary transfer table 20 or 120.

While the elements shown in FIG. 5 are schematically represented in a block form, suitable elements separately known in the art can be provided to accomplish the functions of some of the elements, at least for the drive components and encoder. For instance, the preferred signal and power amplifier is a Control Systems Research motor drive no. NC 540, the preferred motor tachometer is a PMI Motors Corp motor tachometer part no. MC27P, and the preferred encoder is a Computer Conversions Corporation part no. HDSM999-625-USEC.

Figure 7:
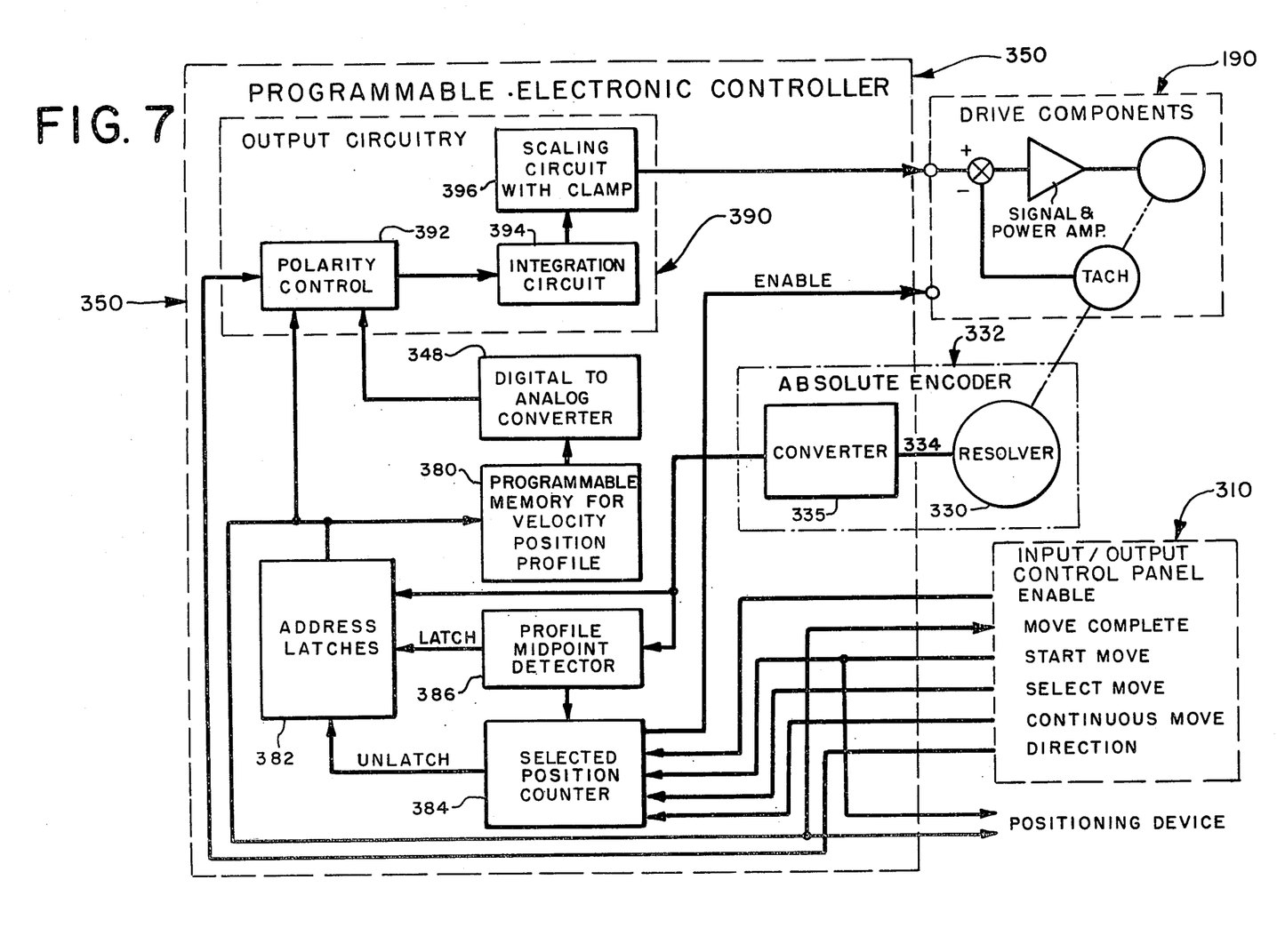
FIG. 7 is a detailed block diagram of the presently preferred embodiment of the programmable electronic control of the present invention.

Referring now to FIG. 7, there is shown an alternate, preferred embodiment of the electronic velocity control means, identified as a programmable electronic controller and designated by reference numeral 350, along with drive components 190, input/output control panel 310, and the absolute encoder 332. The user directs the movement of the movement machine through the input/output control panel 310. The position of the machine is detected and reported by the absolute encoder 332. The electronic velocity control means receives the position information from the absolute encoder 332 and the directions from the user through the control panel 310. This information is processed by the electronic velocity control means to produce analog velocity command signals. These signals are sent to the drive components 190 which include a motor. The signals drive the motor which in turn drives a movement means. As the position of the movement means changes, the velocity control is adjusted for the new position. The position feedback from the encoder 332 provides carefully controlled movement of the machine through its entire move.

The controller 350 includes an absolute encoder converter 335, input circuitry, a programmable memory 380, a digital-to-analog converter 348, and output circuitry 390. The input circuitry comprises a selected position counter 384, a profile midpoint detector 386, and address latches 382. The absolute encoder converter 335 is connected to a resolver 330 over an encoder signal line 334 to form an absolute encoder 332. The converter 335 receives an analog absolute position signal from the resolver 330 through the encoder signal line 334. The converter 335 produces a digital signal indicating the absolute position of the movement machine being controlled. The signal is processed by the input circuitry for addressing the programmable memory 380. A digital velocity signal is read out of the memory in accordance with the velocity-position profile. The digital velocity signal is sent into the digital-to-analog converter 348. The digital signal is converted to an analog signal. The analog signal is scaled by the output circuitry 390, and is then sent to the drive components 190. The output circuitry 390 also has protection circuitry to limit the amplitude of the signal being sent and to limit the rate of change of the signals being sent to the drive components 190.

In detail, the operation of the embodiment in FIG. 7 is as follows. The input/output control panel 310 includes an enabling switch, start switch, a select move line, a continuous move option, a direction switch and a move complete indicator. The enabling switch frees the drive components for operation. The start switch begins the performance of a new move. The select move line allows the user to choose the number of movement units the machine is to be moved. A movement unit is the smallest move the controller 350 is set up to control, indicated by X in the previous embodiment. An alternate move option on the control panel is continuous move. The direction switch allows the operator to choose between two opposite directions for movement. The completion of a move is indicated on the control panel by an indicator, such as a light. Other options may be added to the input/output control panel 310.

The movement means is not limited to moving linearly. One possible alternative is rotational movement. In all cases a move begins at an initial endpoint and is completed at a final endpoint. In the standard mode of operation, the operator selects the number of movement units in a move and the direction of the move. The machine begins its move when the start move switch is activated. The machine will stop when it has moved the selected number of movement units.

An alternate mode of operation is the continuous mode. When the controller 350 is switched into the continuous mode the machine will move constantly at its programmed maximum velocity once that velocity is attained. The operator can return to the standard mode by switching the continuous move switch off. If there are movement units selected by the operator remaining to be completed, the machine will complete the move over these units and then come to a halt.

The enable, start move, select move, and continuous move signals are fed into the selected position counter 384. The enable input is immediately fed to the drive components to free them for operation. The start move signal triggers the beginning of a move and the controller 350 is activated. The select move line initializes the counter 384 at the number of movement units selected. The selected position counter 384 keeps track of the number of movement units remaining in a move. As the machine is moved through the movement units the counter 384 is decremented. If the controller 350 is switched into the continuous mode, a one is added to the counter 384 and decrementing of the counter 384 is prevented.

The counter 384 is decremented by the profile midpoint detector 386 in response to position signals from the absolute encoder 332 which monitors the movement of the machine. Any suitable encoder may be used, but the preferred encoder is one which contains three parts: a resolver 330, a converter 335, and an encoder signal line 334 connecting the resolver 330 to the converter 335. The resolver 330 translates mechanical movement into an analog signal proportional to the size of the move made. The analog signal is carried through the line 334 to the converter 335. Unlike the pulse feedback systems of the prior art, this analog signal line 334 is immune to industrial electrical noise. The converter 335 produces a digital BCD signal indicating the absolute position of the work object within a movement unit.

The absolute encoder 332 divides the movement unit into a number of positions. Ten thousand is the presently preferred number of positions per movement unit. A suitable absolute encoder 332 is chosen to provide a sufficient resolution for the particular application. An encoder with a resolution of 10,000 divisions will produce signals from 0 to 9999, returning to 0 after 9999. A zero indicates an end point of a movement unit.

The digital absolute position signals are fed from the converter 335 into the address latches 382 and the profile midpoint detector 386. The address latches 382 use the digital absolute position signals to provide the input into the programmable memory 380. When the address latches 382 are in an unlatched condition, the digital absolute position signals are passed directly through to be input into the programmable memory 380. The latches can be latched at a particular value which will be continually input into the programmable memory 380 regardless of the digital absolute position signals being sent to the latches. The latched value will be continually sent to the memory 380 until the latches 382 are unlatched and return to sending the digital absolute position signals through to the memory 380 as they are received.

The profile midpoint detector 386 responds to digital absolute position signals indicating that the machine is in the middle of a movement unit. In the case of an absolute encoder with a resolution of 10,000 divisions, the profile midpoint detector 386 responds to position signals of 5,000. The profile midpoint detector 386 responds to a midpoint by sending a signal to the selected position counter 384. This signal will cause the counter to decrement by one, unless the counter is in the continuous mode.

The profile midpoint detector 386 also responds to a midpoint by sending a signal to the address latches 382. This signal will cause the address latches 382 to latch at the midpoint position signal. From this time forward the address latches 382 will feed a signal to the programmable memory 380 indicating that the work object is at the profile midpoint. In the case of a machine with a resolution of 10,000 divisions, the address latches 382 will continue to send the digital absolute position signal for 5,000 to the programmable memory 380. When the machine reaches the last movement unit of the move the controller 350 must decelerate the machine. The latches 382 must be unlatched so that the position of the machine can be fed to the memory 380 during deceleration.

The last movement unit is recognized by the controller 350 when the selected position counter 384 is decremented to zero. When this occurs the selected position counter 384 sends a signal to the address latches 382 which causes them to unlatch. The digital absolute position signals from the converter 335 will now directly address the programmable memory 380. The machine will decelerate as it approaches the end of the last movement unit of the move.

In the case of a selected move consisting of only a single movement unit, address latches 382 will receive simultaneously a latch signal from the profile midpoint detector 386 and an unlatch signal from the selected position counter 384. Thus, no latching will occur. In the continuous mode, the latches 382 are latched at the midpoint signal. When the continuous mode is switched off, normal operation returns and decrementing of the selected position counter 384 is enabled. As in the standard mode the address latches 382 will unlatch when the counter 384 returns to zero.

Figure 8:
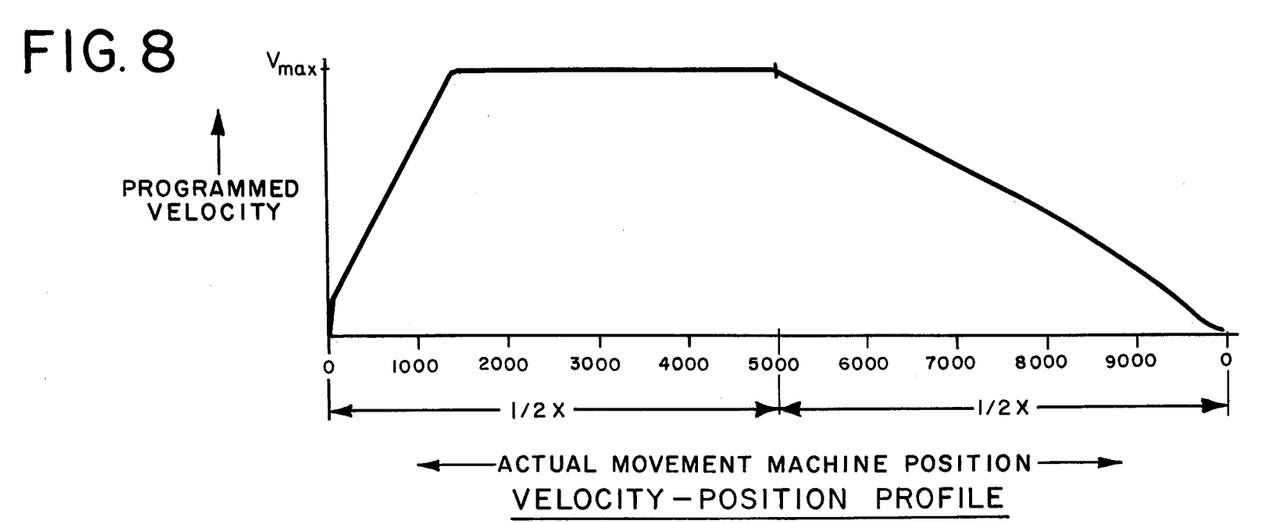
FIG. 8 is a graph of a preferred velocity-position profile for use with a transfer machine, of the present invention.

A velocity-position profile is stored within the programmable memory 380. The profile contains a velocity counterpart for each absolute position. The present invention can be used in many applications since many different suitable velocity-position profiles may be programmed into the programmable memory 380. FIG. 8 is a graph of a preferred velocity-position profile for a movement machine, such as those shown in FIGS. 1 and 3. The graphed line is actually not a line but a series of points, each indicating an absolute position and its programmed velocity counterpart. The velocity-position profile provides velocity and acceleration control over one complete movement unit. The first half of the movement unit is the acceleration phase and the second half of the movement unit is the deceleration phase. In FIG. 8 each half of the movement unit is indicated by ½X. For moves greater than one movement unit the velocity will be maintained constant at its maximum, which is the velocity value at the midpoint 5000, over the positions from the end of acceleration phase to the beginning of the last half of the last movement unit.

Figure 9:
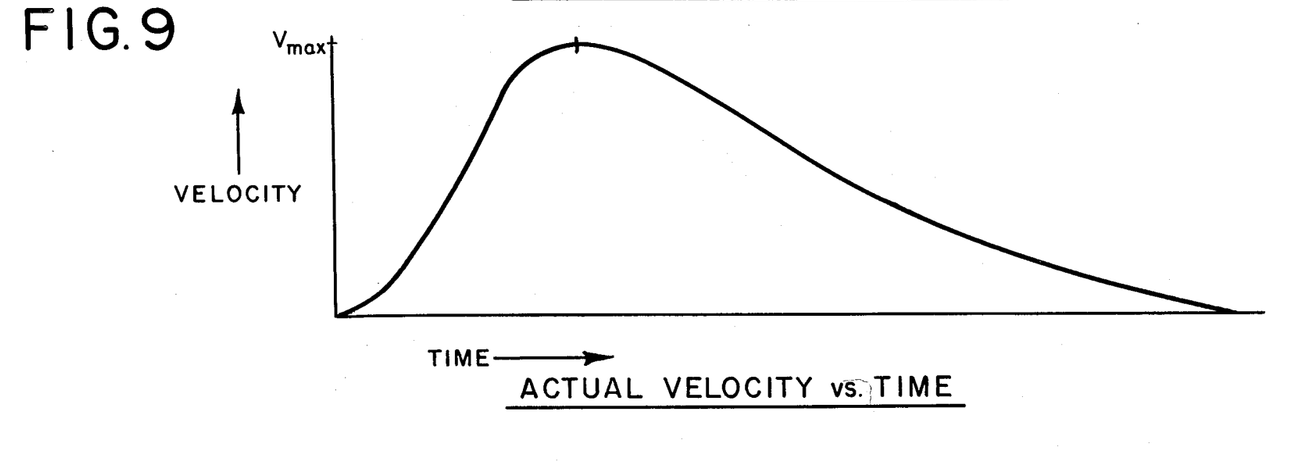
FIG. 9 is a graph of actual velocity versus time for a transfer machine operated in accordance with the present invention and the velocity-position profile as depicted on the graph of FIG. 8.

Although the signals being produced are considered velocity signals, acceleration is also being controlled because acceleration is the rate of change of the velocity. FIG. 9 shows the actual velocity of the movement machine as a function of time as it would be produced by the velocity-position profile depicted in FIG. 8. The acceleration of the movement machine is the derivative of the function graphed in FIG. 9.

The memory 380 responds to the position signals from the address latches 382 by reading out the corresponding digital velocity signal from the velocity-position profile. The digital-to-analog converter 348 and the output circuitry 390 prepare the digital velocity signal from the programmable memory 380 for output into the drive components 190. The digital-to-analog converter 348 takes the digital velocity signal and sends a corresponding analog velocity signal to the output circuitry 390.

The output circuitry 390 has three separate circuits: a polarity control 392, an integration circuit 394 and a scaling circuit with a clamp 396. The analog velocity signal produced by the digital-to-analog converter 348 is first fed into the polarity control 392, which also receives inputs from the direction switch on the input/output control panel 310 and from the address latches 382. The polarity of the signal sent to the motor determines the direction of the movement machine motion. The desired direction is produced by the polarity control 392 in response to the signal from the operator's choice of direction on the direction switch.

The polarity control 392 also acts as an error limiting circuit. It prevents mechanical loading from moving the machine from an endpoint. When the address latches 382 are sending a signal representing the position zero, the machine is at an endpoint. After the address latches 382 have delivered a position signal indicating the machine has reached an endpoint, signals indicating a position beyond the endpoint will cause the polarity control to reverse the polarity of the velocity signals so that the machine will not be moved from its endpoint until a new move is started. In practice, only an unusual loading circumstance would cause a variation of the machine from the endpoint.

As the machine changes its position within an acceleration or deceleration phase of a move, the velocity signals change. The integration circuit 394 limits the waveform rise time between these different velocity signals. This serves to limit the acceleration rate of the motor exponentially. The steps of the waveform are also obviously smoothed out.

The scaling circuit 396 increases or decreases the amplitude of the velocity signal so that it is capable of driving the motor. It is possible to add a feature to the control panel which would allow the user to change the scaling ratio. Thus, the user could decide whether to run the machine at full speed or at some fraction thereof. The scaling circuit 396 includes a clamp which limits the final amplitude of the velocity signal delivered by the output circuitry 390. The clamp is set for the particular machine to limit motion commands to within bounds not detrimental to the equipment. Thus, the equipment would be protected from misuse of the programmable feature.

In applications where work is done on an object carried by the machine while it is at the endpoint, mechanical means may be desired to secure movement from the endpoint and reduce the stress on the motor. A positioning device 70 and 174, in FIGS. 2 and 4, can be inserted into positioning holes 72 and 172 to prevent movement from an endpoint. A position signal from the address latches 382 indicating that an endpoint has been reached will cause the positioning device to be inserted. A start move signal from the control panel 310 will retract the positioning device and allow the next move to progress.

Though the embodiments described and disclosed above are preferred, other embodiments and refinements which do not part from the true spirit and scope of the present invention may be conceived by those skilled in the art. It is intended that all such embodiments and refinements be covered by the following claims.

We claim:

1. An apparatus for electronically controlling the velocity, acceleration and positioning of a movement machine through the production of analog velocity command signals comprising:

means for encoding absolute position signals indicating a succession of positions passed through by said movement machine, said encoding means being coupled to said movement machine;

memory means for storing a velocity-position profile;

means of addressing said memory means with absolute position signals, such that digital velocity signals are read out from said memory means corresponding to the absolute position signals in accordance with the velocity-position profile; and     output means for receiving the digital velocity signals to produce analog velocity command signals, wherein said output means includes means for converting the digital velocity signals into analog velocity signals, and means for scaling the analog velocity signals to produce analog velocity command signals with an amplitude sufficient to drive said movement machine.

2. A multiple position movement machine for producing a controlled move between endpoints comprising:
movement means;
a motor coupled to said movement means for producing controlled movement of said movement means; and
electronic velocity control means for sending analog velocity command signals to said motor, said control means including:
means for encoding absolute position signals indicating a succession of positions arrived at by said movement means, said encoding means being coupled to said movement means;
memory means for storing a velocity-position profile, wherein said memory means is programmable so that the stores velocity-position profile may be changed;
means for addressing said memory means with absolute position signals, such that digital velocity signals are read out from said memory means corresponding to the absolute position signals in accordance with the velocity-position profile; and
output means for producing the analog velocity command signals in response to the digital velocity signals, wherein said output means includes means for converting the digital velocity signals into analog velocity signals, and means for scaling the analog velocity signals to produce analog velocity command signals with an amplitude sufficient to drive said motor.

3. The apparatus of claims 1 or 2 wherein said means for encoding includes a resolver for producing analog absolute position signals; means for converting the analog position signals into digital absolute position signals; and electrical connector means for conducting the analog position signals from said resolver to said converting means.

4. A multiple position movement machine that moves in a controlled manner from an initial endpoint to a final endpoint comprising:
movement means;
means for encoding absolute position signals indicating a succession of positions arrived at by said movement machine;
memory means for storing a velocity-position profile;
means for addressing said memory means with absolute position signals, such that digital velocity signals are read out from said memory means corresponding to the absolute position signals in accordance with the velocity-position profile;
a digital-to-analog converter which converts the digital velocity signals into analog velocity signals;
integration circuit means, coupled to said digital-to-analog converter to receive the analog velocity signals, for limiting the rate of change of the analog velocity signals;
scaling means for receiving the output of said integration circuit means and producing analog velocity command signals having scaled amplitudes; and
a motor, mechanically coupled to said movement means and electrically coupled to said scaling means, for producing controlled movement of said movement means in response to the analog velocity command signals.

5. The apparatus of claim 4 further including clamping circuit means coupled between said digital-to-analog converter and said motor, for limiting the amplitude of the analog velocity command signals.

6. The apparatus of claim 4 further including polarity control means responsive to said addressing means, for controlling the polarity of the analog velocity signals to ensure that said movement means is moving in the direction towards the final endpoint and also to restrain movement from a final endpoint by reversing the polarity in response to signals from said addressing means indicating a position beyond the final endpoint.

7. The apparatus of claim 6 further including a mechanical position holding means which is inserted into the movement means in response to a signal from said addressing means indicating that the movement means is at the final endpoint, for preventing movement of said movement means.

8. A multiple position programmable movement machine capable of controlled movement and accurate positioning comprising:
movement means;
a servo-motor coupled to said movement means for producing controlled motion of said movement means over a move, defined as a selected number of movement units from an initial endpoint, to a final endpoint in response to analog velocity command signals;
an encoder coupled to said movement means to produce absolute position signals indicating the succession of positions within a movement unit as they are arrived at by said movement means;
counter means for indicating the number of movement units remaining in a move;
operator control means for initiating a move by setting said counter means at the selected number of movement units and indicating the desired direction;
programmable memory means for storing a selected velocity-position profile and for reading out digital velocity signals in response to position signals in accordance with the velocity-position profile;
address latch means, connected to receive absolute position signals from said encoder, for addressing said programmable memory means with the absolute position signals;
means, responsive to detection of absolute position signals of one-half of a movement unit, for decrementing said counter means and for latching said address latch means at the absolute position signal indicating one-half of a movement unit;
means for unlatching said address latch means in response to the decrementing of said counter means to zero;
a digital-to-analog converter, coupled to said programmable memory means, which converts the digital velocity signals into analog velocity signals;
polarity control means, responsive to the direction selection of said operator control means and signals from said address latch means, for controlling the polarity of the analog velocity signals, as they are received from said digital-to-analog converter to direct said movement means in the selected direction and also to restrain movement of said movement means from a final endpoint by reversing the polarity of the analog velocity signals in response to signals from said address latch means indicating a position beyond the final endpoint;

an integration circuit receiving the signals from the polarity control means and limiting the rate of change of these signals, thereby smoothing the acceleration of said movement means;

means for scaling the amplitude of the analog velocity signals to produce analog velocity command signals; and a clamping circuit to limit the amplitude of the analog velocity command signals, before they are delivered to said servo-motor.

9. The apparatus of claim 8 further including a mechanical position holding means which is inserted into the movement means in response to a signal from said address latch means indicating that the movement means is at the final endpoint, for preventing movement of said movement means.

10. A method for electronically controlling the velocity, acceleration and positioning of a movement machine through the production of analog velocity command signals comprising:

encoding absolute position signals indicating a succession of positions arrived at by said movement machine;

reading out digital velocity signals from a memory, corresponding to the absolute position signals in accordance with a velocity-position profile;

converting the digital velocity signals into analog velocity signals;

limiting the rate of change of the analog velocity signals;

scaling the analog velocity signals to produce analog velocity command signals;

limiting the magnitude of the analog velocity command signals;

feeding the analog velocity command signals into a motor; and driving a movement machine with the motor.

* * * * *

UNITED STATES PATENT AND TRADEMARK OFFICE
CERTIFICATE OF CORRECTION

PATENT NO. : 4,469,993

DATED : September 4, 1984

INVENTOR(S) : Douglas L. Swanson and Ronald K. Turk

It is certified that error appears in the above-identified patent and that said Letters Patent is hereby corrected as shown below:

IN THE CLAIMS

In claim 2(column 13, line 21), please delete "stores" and substitute therefore --stored--.

Signed and Sealed this

Fourteenth Day of October, 1986

[SEAL]

Attest:

DONALD J. QUIGG

Attesting Officer

Commissioner of Patents and Trademarks